US006984964B2

(12) United States Patent
Chang

(10) Patent No.: US 6,984,964 B2
(45) Date of Patent: Jan. 10, 2006

(54) SOFT-SWITCHING THREE-PHASE POWER FACTOR CORRECTION CONVERTER

(75) Inventor: Yu-Ming Chang, Taoyuan Shien (TW)

(73) Assignee: Delta Electronics Inc., (TW)

( * ) Notice: Subject to any disclaimer, the term of this patent is extended or adjusted under 35 U.S.C. 154(b) by 37 days.

(21) Appl. No.: 10/838,446

(22) Filed: May 4, 2004

(65) Prior Publication Data

US 2005/0024023 A1 Feb. 3, 2005

(30) Foreign Application Priority Data

Jul. 28, 2003 (TW) .............................. 92120577 A

(51) Int. Cl.
*G05F 1/70* (2006.01)

(52) U.S. Cl. ...................................................... 323/207

(58) Field of Classification Search ................ 323/207, 323/205; 363/17, 98, 132

See application file for complete search history.

(56) References Cited

U.S. PATENT DOCUMENTS 5,608,295 A * 3/1997 Moisin ........................ 315/247

* cited by examiner

*Primary Examiner*—Shawn Riley
(74) *Attorney, Agent, or Firm*—Volpe and Koenig, PC

(57) ABSTRACT

The proposed converter includes: three boost inductors, three filter capacitors, six main switch modules each having a switch element, a diode and a resonant capacitor, two auxiliary switches, two main diodes, a resonant inductor, and two output capacitors. A control circuit is employed for generating driving signals from six SPWM signals to drive the six main switches and the two auxiliary switches of the converter. A six-step control method is employed to adjust the SPWM signals and a soft-switching method is employed to generate the driving signals to turn on/off the six main switch modules and the two auxiliary switches when the voltage on the second terminal of each main switch module/auxiliary switch is zero and the current flows into each auxiliary switch is zero to correct the power factor.

14 Claims, 14 Drawing Sheets

SOFT-SWITCHING THREE-PHASE POWER FACTOR CORRECTION CONVERTER

FIELD OF THE INVENTION

The present invention relates to a three-phase power factor correction converter. More specifically, this invention relates to a soft-switching three-phase power factor correction converter.

BACKGROUND OF THE INVENTION

Please refer to FIG. 1, it shows the schematic circuit diagram of a traditional three-phase power factor correction converter of the prior art. In which, the three-phase power factor correction converter includes three filter capacitors Crt, Crs, and Cst, three boost inductors Lr, Ls, and Lt, six diodes Dr, Ds, Dt, Du, Dv, and Dw, and an output capacitor Cb. Although this apparatus has the advantage of having a relatively simple configuration, but the power factor of such an apparatus could only reach the highest value of around 0.93. Besides, the inductors of the above-mentioned apparatus, made of silicon steel, are relatively heavier and larger. Due to the aforementioned drawbacks, the passive power factor correction method employed in the above-mentioned circuit as shown in FIG. 1 has been replaced by an active power factor correction method employed in a different circuit of the three-phase power factor correction converter introduced hereinafter.

Please refer to FIG. 2, it shows the schematic circuit diagram of another three-phase power factor correction converter of the prior art. This apparatus is proposed to improve the aforementioned drawbacks of the three-phase power factor correction converter of the prior art. The differences between the apparatus of FIG. 1 and the apparatus of FIG. 2 are that an active switch S and a diode Db are included in the circuit of FIG. 2 so as to achieve a higher power factor and to lower the total harmonic distortion (THD) through the closing and opening of the switch S. However, there are several obvious drawbacks regarding the apparatus of FIG. 2 described as follows.

Firstly, there are relatively higher switching losses of the active switch S due to the reverse recovery time of the diode Db. When the output is a relatively higher voltage value, 800 VDC for example, the switching losses of the active switch S are even worse relatively. Secondly, the desired requirements of decreasing the sizes of the magnetic elements for the apparatus of FIG. 2 are infeasible since the switching frequency must be increased in order to do so and which will result in the relatively higher switching losses. Thirdly, the desired requirement of having a THD less than 5% could not be achieved by the apparatus as shown in FIG. 2.

Keeping the drawbacks of the prior arts in mind, and employing experiments and research full-heartily and persistently, the applicant finally conceived the soft-switching three-phase power factor correction converter.

SUMMARY OF THE INVENTION

It is therefore an object of the present invention to propose a soft-switching three-phase power factor correction converter for correcting the power factor, lowering the THD, and decreasing the sizes of the magnetic elements of the converter relatively.

According to the aspect of the present invention, the three-phase power factor correction converter includes: a filter circuit having a plurality of capacitors electrically connected to a three-phase commercial power supply, a plurality of boost inductors electrically connected to the filter circuit, a plurality of half-bridge switching devices each having an upper main switch module, a lower main switch module, and a connecting node of the upper and lower main switch modules electrically connected to one of the boost inductors; and a soft-switching cell electrically connected to the switching devices for soft-switching the switching devices, includes: a plurality of auxiliary switching devices each having an upper auxiliary switch and a lower auxiliary switch electrically connected to the half-bridge switching devices, a plurality of resonant inductors each having a first terminal electrically connected to one of the auxiliary switching devices, a plurality of output capacitors each electrically connected in series to one of the resonant inductors, and a first and a second diodes electrically connected to the auxiliary switching devices and the output capacitors, wherein, the converter is electrically connected to a control circuit for inputting a plurality of driving signals generated according to a six-step control method, and the driving signals are employed to drive the switching devices and the auxiliary switching devices according to a soft-switching method so as to achieve a correction of a power factor for the converter.

According to another aspect of the present invention, the three-phase power factor correction converter, includes: a first inductor, a second inductor, a third inductor, a first capacitor having a first terminal electrically connected to a first terminal of the first inductor and a second terminal electrically connected to a first terminal of the second inductor, a second capacitor having a first terminal electrically connected to the first terminal of the second inductor and a second terminal electrically connected to a first terminal of the third inductor, a third capacitor having a first terminal electrically connected to the first terminal of the first inductor and a second terminal electrically connected to the first terminal of the third inductor, a first main switch module having a first terminal electrically connected to a second terminal of the first inductor, a second terminal, and a control terminal, a second main switch module having a first terminal electrically connected to a second terminal of the second inductor, a second terminal electrically connected to the second terminal of the first module, and a control terminal, a third main switch module having a first terminal electrically connected to a second terminal of the third inductor, a second terminal electrically connected to the second terminal of the second module, and a control terminal, a fourth main switch module having a first terminal, a second terminal electrically connected to the second terminal of the first inductor, and a control terminal, a fifth main switch module having a first terminal electrically connected to the first terminal of the fourth module, a second terminal electrically connected to the second terminal of the second inductor, and a control terminal, a sixth main switch module having a first terminal electrically connected to the first terminal of the fifth module, a second terminal electrically connected to the second terminal of the third inductor, and a control terminal, a first auxiliary switch having a first terminal, a second terminal electrically connected to the second terminal of the third module, and a control terminal, a second auxiliary switch having a first terminal electrically connected to the first terminal of the sixth module, a second terminal electrically connected to the first terminal of the first auxiliary switch, and a control terminal, a fourth inductor having a first terminal electrically connected to the first terminal of the first auxiliary switch, a fourth capacitor having a first terminal electrically connected to a second terminal of the fourth inductor, a fifth capacitor having a first terminal electrically connected to the second terminal of the fourth inductor, a first diode having an anode electrically connected to the second terminal of the first auxiliary switch and a cathode electrically connected to a second terminal of the fourth capacitor, and a second diode having an anode electrically connected to a second terminal of the fifth capacitor and a cathode electrically connected to the first terminal of the second auxiliary switch, in which a load of the converter includes a first terminal electrically connected to the second terminal of the fourth capacitor and a second terminal electrically connected to the second terminal of the fifth capacitor, the converter is electrically connected to a commercial power supply through the first terminals of the first to the third inductors, the converter is electrically connected to a control circuit through the control terminals of the first to the sixth modules and the first and the second auxiliary switches for inputting a plurality of driving signals, and the driving signals are employed to drive the first to the sixth modules and the first and the second auxiliary switches to achieve a correction of a power factor for the converter.

Preferably, each of the first to the sixth modules further includes a switch element, a diode element, and a capacitor element, the switch element includes a first, a second, and a control terminals which serve as the first, the second, and the control terminals of each of the first to the sixth modules respectively, an anode of the diode element is electrically connected to the first terminal of the switch element, a cathode of the diode element is electrically connected to the second terminal of the switch element, and a first and a second terminals of the capacitor element are electrically connected to the anode and the cathode of the diode element respectively.

Preferably, each of the switch element, the first auxiliary switch, and the second auxiliary switch is one of a MOSFET and a combination of an IGBT and a diode electrically connected in parallel, and the capacitor element is a resonant capacitor.

Preferably, the capacitor element is one of a built-in capacitor and an external capacitor.

Preferably, each of the first, the second, and the third inductors is a boost inductor.

Preferably, each of the first, the second, and the third capacitors is a filter capacitor.

Preferably, the fourth inductor is a resonant inductor.

Preferably, each of the fourth and the fifth capacitors is an electrolytic capacitor.

Preferably, each of the first and the second auxiliary switches is a unidirectional IGBT.

Preferably, each of the first and the second diodes is a synchronous diode.

Preferably, the synchronous diode further includes a diode element and a synchronous switch, wherein the synchronous switch includes a first terminal electrically connected to an anode of the diode element, a second terminal electrically connected to a cathode of the diode element, and a control terminal.

Preferably, the control circuit further includes: a first differential amplifier circuit electrically connected to the commercial power supply, a first precision full-wave rectifying circuit electrically connected to the first differential amplifier circuit, a zero-crossing detector electrically connected to the first differential amplifier circuit, an input current, a Hall CT sensor electrically connected to the input current, a second precision full-wave rectifying circuit electrically connected to the Hall CT sensor, an output voltage of the converter, a second differential amplifier circuit electrically connected to the output voltage, a digital signal processor (DSP) having a built-in A/D converter electrically connected to the first precision full-wave rectifying circuit, the zero-crossing detector, the second precision full-wave rectifying circuit, and the second differential amplifier circuit for obtaining an input voltage from the commercial power supply, the input current, and the output voltage through the A/D converter and outputting six sinusoidal pulse-width modulation (SPWM) signals according to a six-step control method, a DC-link voltage, a zero-voltage detecting circuit electrically connected to the DC-link voltage, a complex programmable logic device (CPLD) electrically connected to the DSP and the detecting circuit for combining the six SPWM signals with an output of the detecting circuit by a soft-switching method so as to get the driving signals, and an isolated driver having a driving chip and a plurality of output terminals electrically connected to the CPLD and the DSP, wherein the driving signals are outputted from the driver and the first to the sixth modules and the first and the second auxiliary switches are driven by the driving signals through the chip.

The present invention may best be understood through the following descriptions with reference to the accompanying drawings, in which:

DETAILED DESCRIPTION OF THE PREFERRED EMBODIMENT

Figure 1:
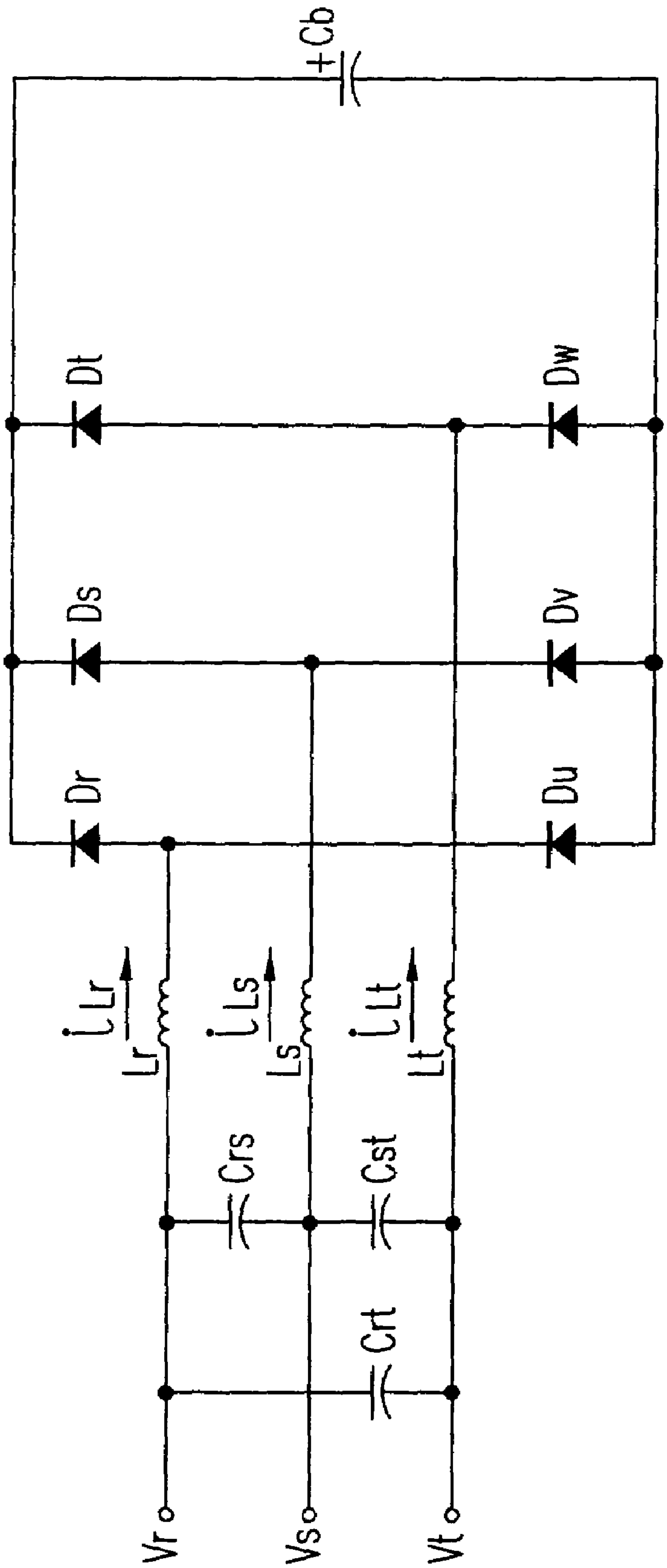
FIG. 1 is the schematic circuit diagram of a three-phase power factor correction converter of the prior art.
Figure 2:
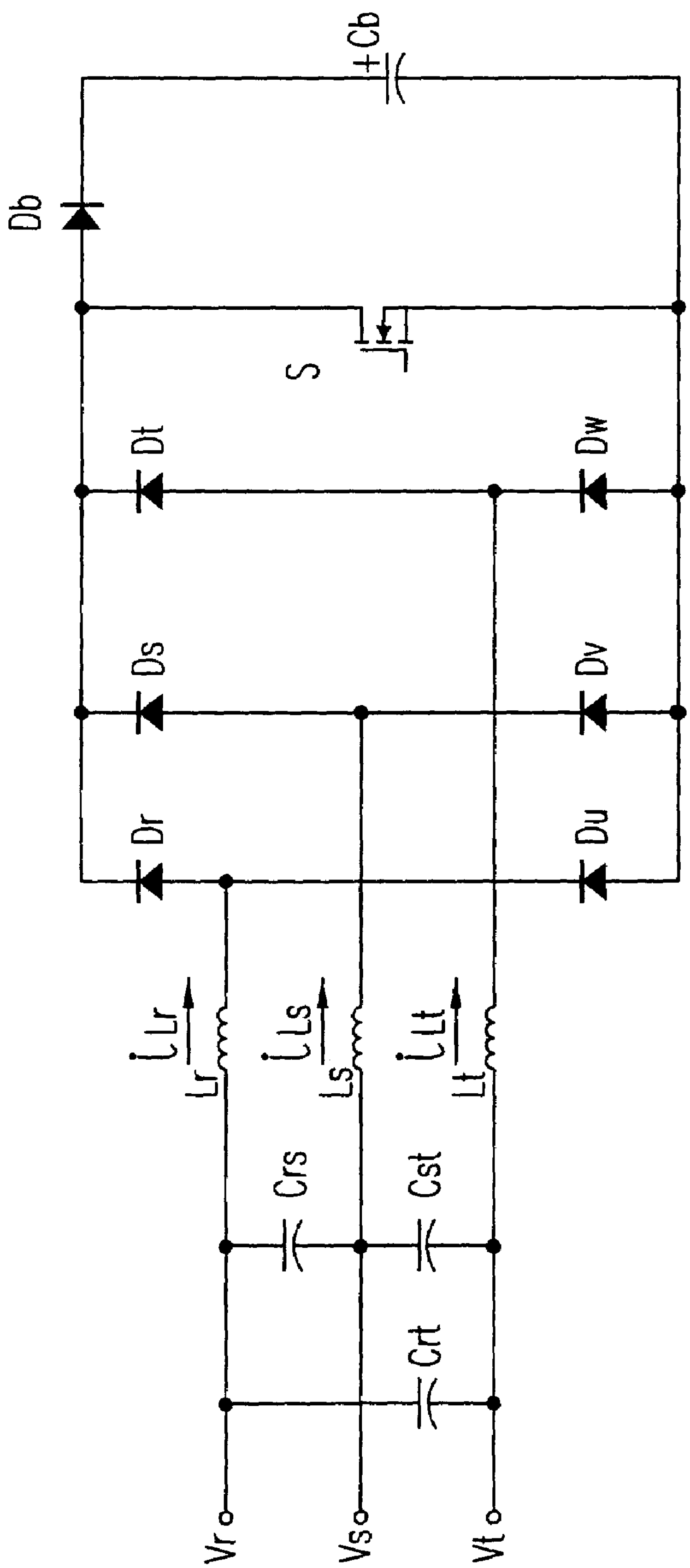
FIG. 2 is the schematic circuit diagram of another three-phase power factor correction converter of the prior art.
Figure 3:
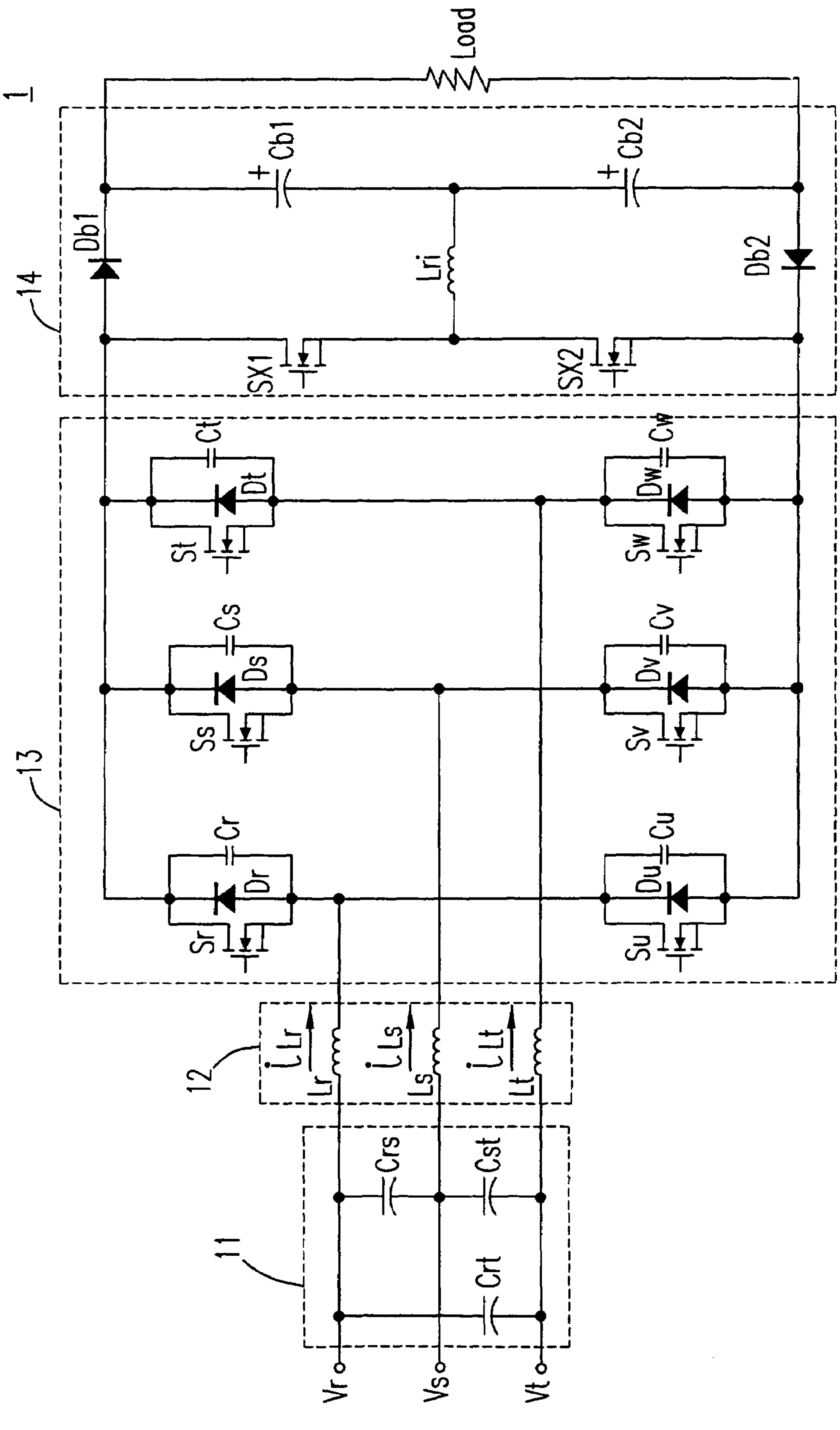
FIG. 3 is the schematic circuit diagram of the first preferred embodiment of the three-phase power factor correction converter of the present invention.

Please refer to FIG. 3, it shows the schematic circuit diagram of the first preferred embodiment of the three-phase power factor correction converter of the present invention 1 which includes a filter circuit 11, a plurality of boost inductors 12, a plurality of half-bridge switching devices 13 (each having a upper main switch module and a lower main switch module), and a soft-switching cell 14 (including a plurality of auxiliary switching devices each having an upper auxiliary switch and a lower auxiliary switch, a plurality of resonant inductors, a plurality of output capacitors, and a first and a second diodes). In which, the proposed converter 1 includes: three boost inductors Lr, Ls, and Lt, three filter capacitors Crs, Cst, and Crt (for filtering the high frequency harmonics inputted through the commercial power supply), six main switch modules Sr, Ss, St, Su, Sv, and Sw, two auxiliary switches Sx1 and Sx2, a resonant inductor Lri, two main diodes Db1 and Db2 (rectifying diodes having relatively lower forward voltages are employed), and two output/electrolytic capacitors, Cb1 and Cb2. Among which, each of the first to the sixth main switch modules further includes: a switch element (Sr, Ss, St, Su, Sv, and Sw respectively) a diode (Dr, Ds, Dt, Du, Dv, and Dw respectively) and a resonant capacitor (Cr, Cs, Ct, Cu, Cv, and Cw respectively) electrically connected to each other in parallel. The proposed converter of the present invention is operated according to a six-step control method (In each step, only three main switch modules are started and another three main switch modules are shut down. For example, in the first step, Sr, St, and Ss are started, in the second step, Su, Sv, and Sw are started, in the third step, Ss, Sr, and St are started, in the fourth step, Sv, Su, and Sw are started, in the fifth step, St, Ss, and Sr are started, and in the sixth step, Sw, Su, and Sv are started.) and a soft-switching method (Turn on/off the first to the sixth main switch modules when the voltages on the second terminals of the main switch modules are zero and turn on/off the first and the second auxiliary switches when the currents flow into the first and the second auxiliary switches are zero respectively.). The proposed apparatus of the present invention as shown in FIG. 3 has the following advantages: correcting the input power factor to approach the value of 1, lowering the THD to less than 5%, decreasing the sizes of the magnetic elements of the converter, increasing the efficiency of the converter, decreasing the voltage changing rates of the main switch modules (dv/dt), decreasing the current changing rates of the auxiliary switches (di/dt), decreasing the EMI, etc. relatively.

The operational principles of the proposed soft-switching three-phase power factor correction converter are described as follows according to the configuration of FIG. 3. There are 7 operational modes of the proposed apparatus divided according to the switching principles and the sequence of the switches, Mode 0 to Mode 7, respectively (Mode 8 is equivalent to Mode 0 and a new cycle of Mode 0 to Mode 7 begins at Mode 8), and the operational principles are explained according to FIGS. 4 to 12.

Figure 4:
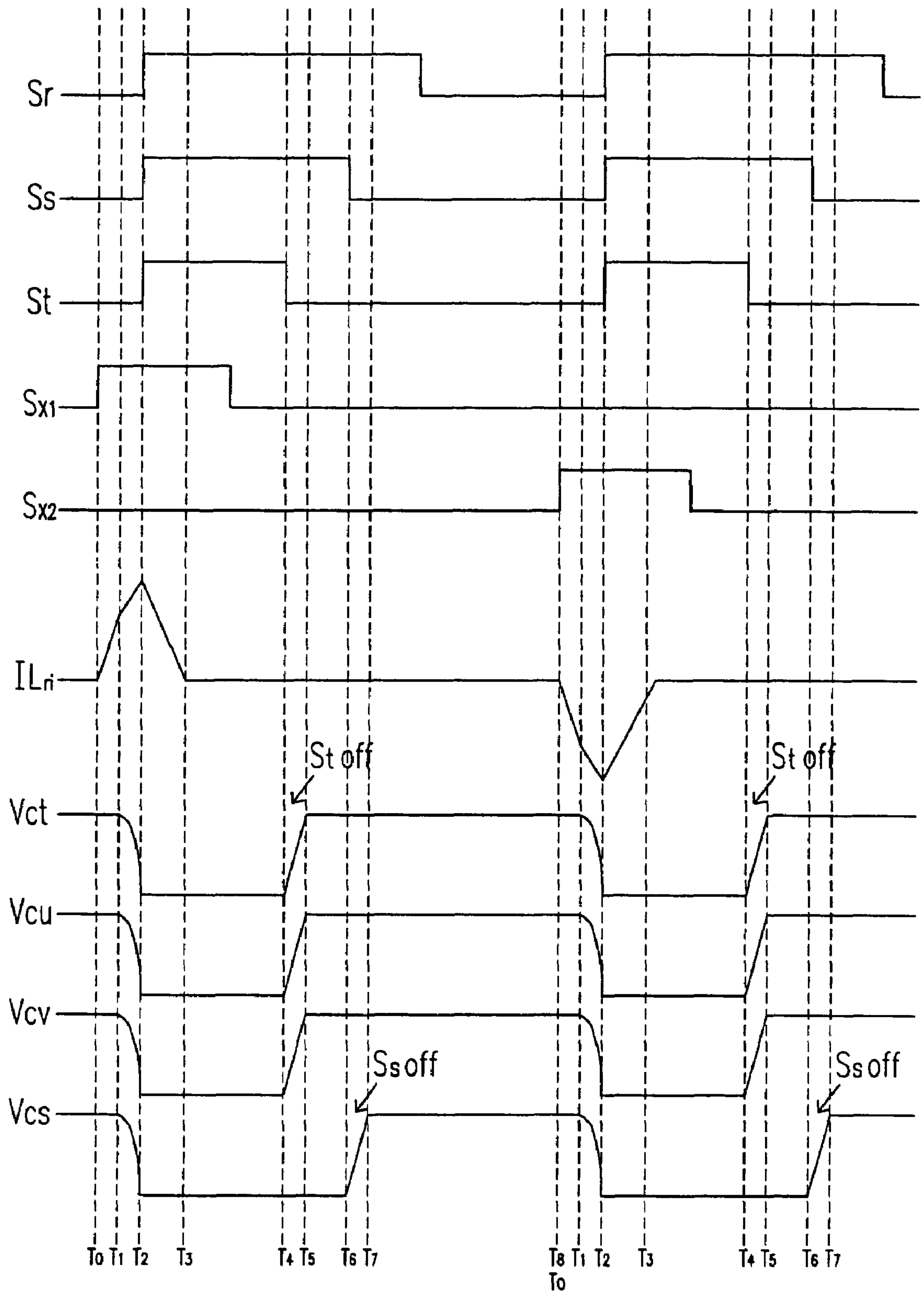
FIG. 4 shows the waveforms of the driving signals of the first to the third main switch modules and the first and the second auxiliary switches, the current on the resonant inductor, and the voltages across the second to the fifth resonant capacitors of the first preferred embodiment of the three-phase power factor correction converter of the present invention respectively.

Please refer to FIG. 4, it shows the waveforms of the driving signals of the first to the third main switch modules and the first and the second auxiliary switches (Sr, Ss, St, Sx1, and Sx2), the current on the resonant inductor Lri, iLri, and the voltages across the third to the fifth and the second resonant capacitors Ct, Cu, Cv, and Cs, Vct, Vcu, Vcv, and Vcs, of the first preferred embodiment of the three-phase power factor correction converter of the present invention respectively. In which, the time interval before t0 is Mode 0, the time interval between t0 and t1 is Mode 1, the time interval between t1 and t2 is Mode 2, the time interval between t2 and t3 is Mode 3, the time interval between t3 and t4 is Mode 4, the time interval between t4 and t5 is Mode 5, the time interval between t5 and t6 is Mode 6, the time interval between t6 and t7 is Mode 7, and the time interval between t7 and t8 is Mode 8 (=Mode 0) divided according to the time intervals on the horizontal axis.

Figure 5:
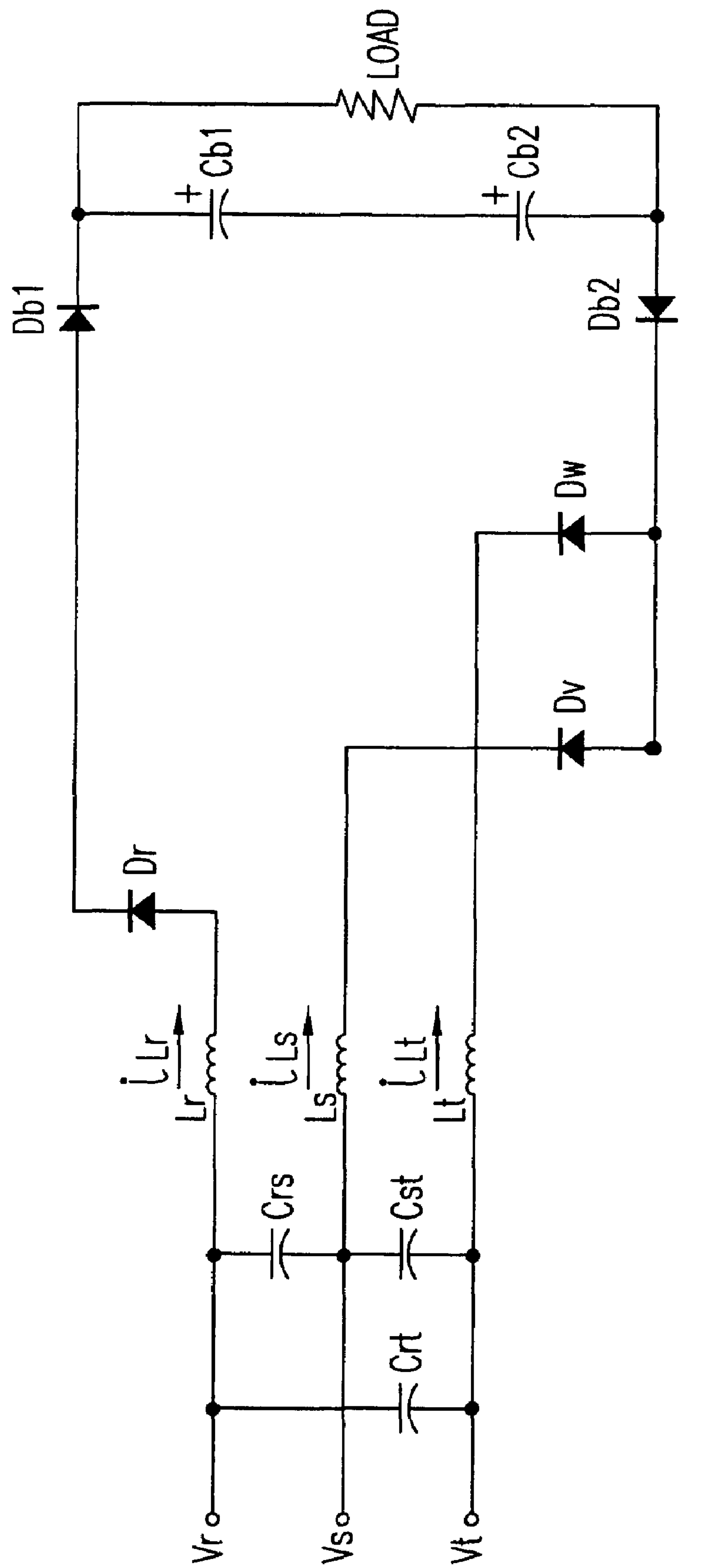
FIGS. 5 to 12 are the equivalent circuit diagrams showing the operational modes of the three-phase power factor correction converter of the present invention respectively.

Please refer to FIG. 5, which is the equivalent circuit diagram showing the operational principles of Mode 0. According to the operational principles of Mode 0, the boost inductor Lr is in the discharging mode, the energies of the boost inductors Lr, Ls, and Lt and the input voltages from the commercial power supply Vr, Vs, and Vt are transferred to the output capacitors Cb1 and Cb2, and the load through the diodes Dr, Db1, Db2, Dv, and Dw respectively.

Figure 6:
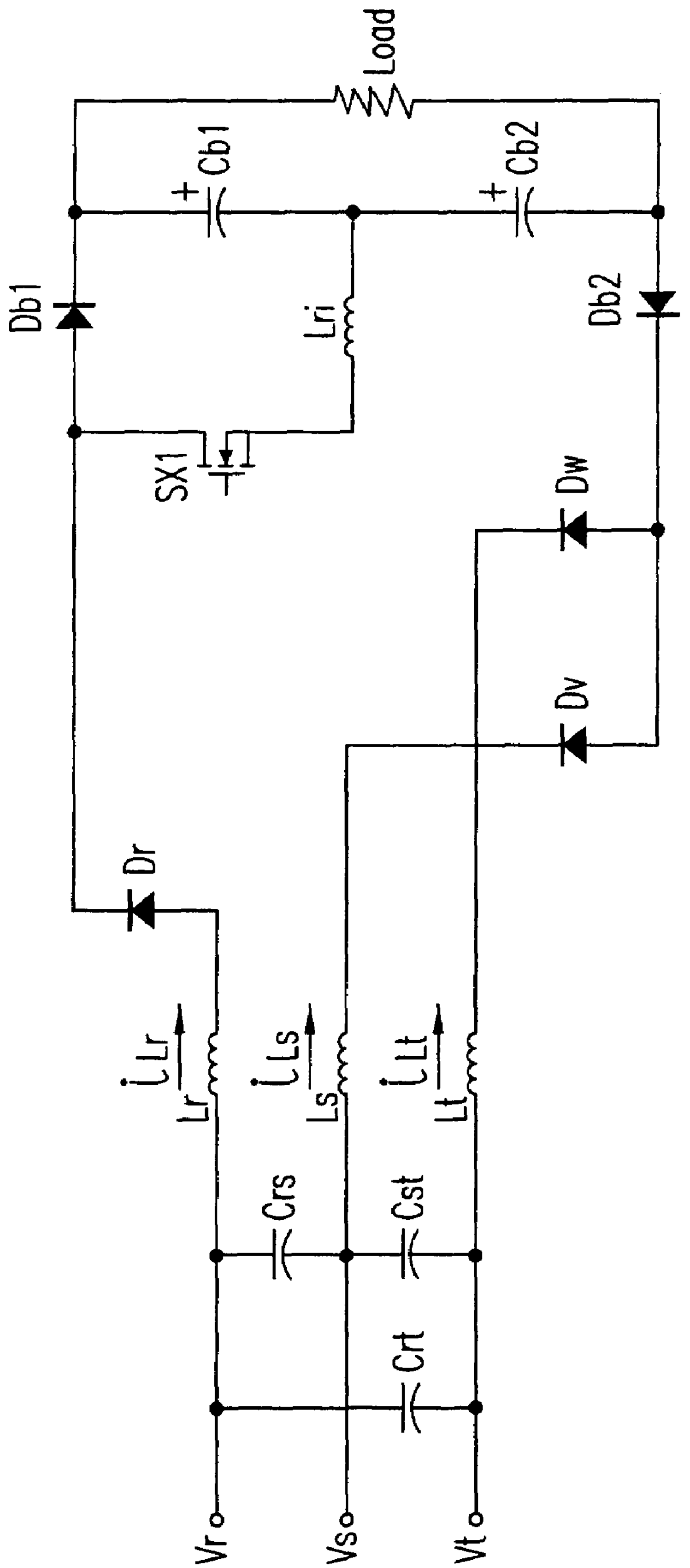

Please refer to FIG. 6, which is the equivalent circuit diagram showing the operational principles of Mode 1. Mode 1 begins when the auxiliary switch Sx1 (or Sx2) is turned on. Due to the influence of the resonant inductor Lri, the auxiliary switch Sx1 can be turned on under the zero current circumstances so as to have no switching losses. During the operational period of Mode 1, the current on the resonant inductor Lri, iLri, is increased linearly, and iLri can be represented by the following formula:

$$\left(Vo - \frac{1}{2}Vo\right) = Lri\frac{di_{Lri}}{dt}, \text{ namely,}$$

$$i_{Lri} = \frac{\frac{1}{2}Vo}{Lri}t.$$

Where Vo is the output voltage, Lri is the inductance of the inductor Lri, and t is the time.

Figure 7:
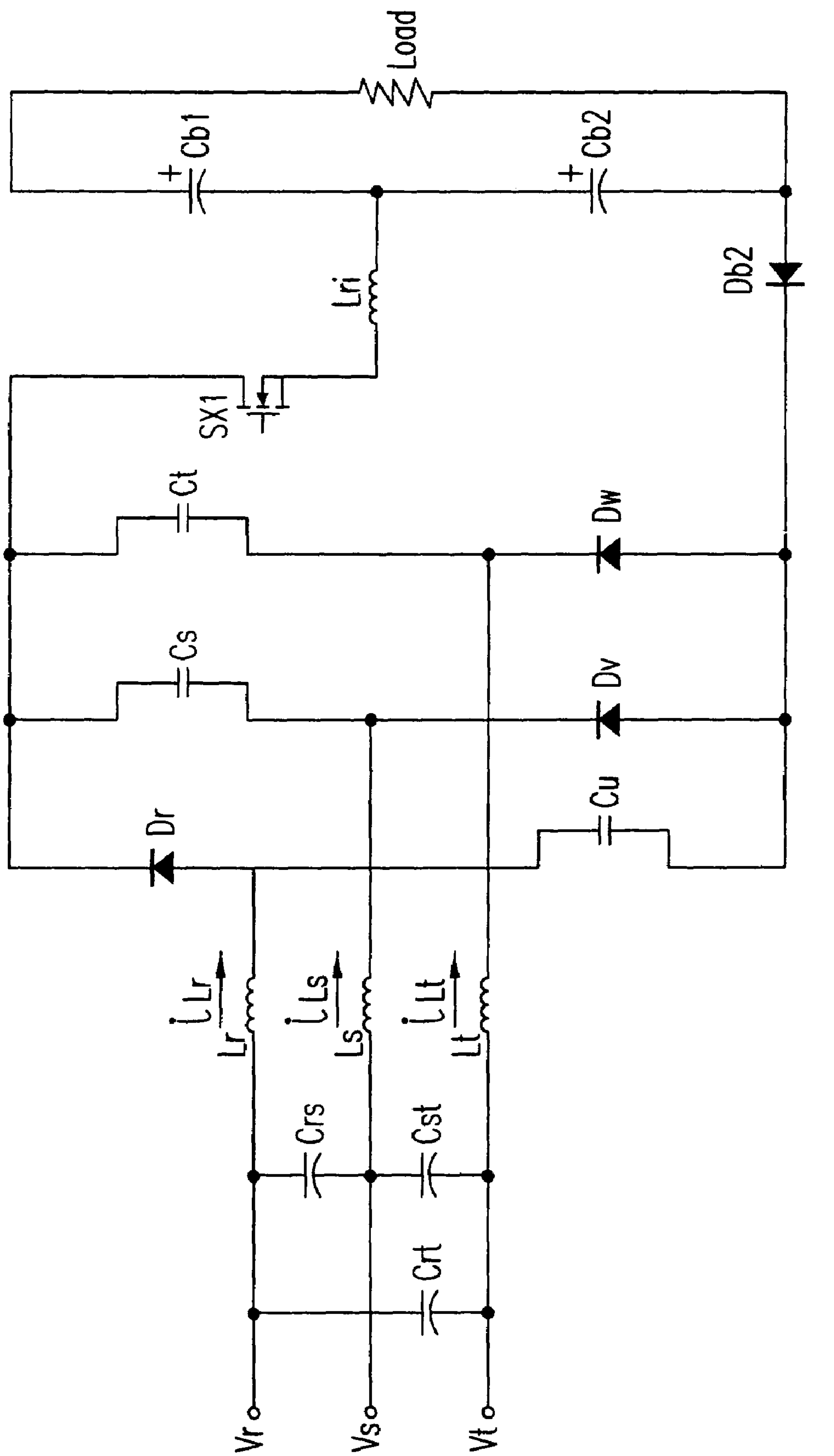

Please refer to FIG. 7, which is the equivalent circuit diagram showing the operational principles of Mode 2. Mode 2 begins when the current on the boost inductor Lr, iLr, equals to iLri and there is no switching loss on the diode Db1 since the diode Db1 is turned off smoothly at this moment. When the diode Db1 is turned off, there is the resonance generated among the resonant capacitors Cu, Cs, and Ct and the boost inductor Lr. Mode 2 is ended at the moment when the three switches Sr, Ss, and St are turned on.

Figure 8:
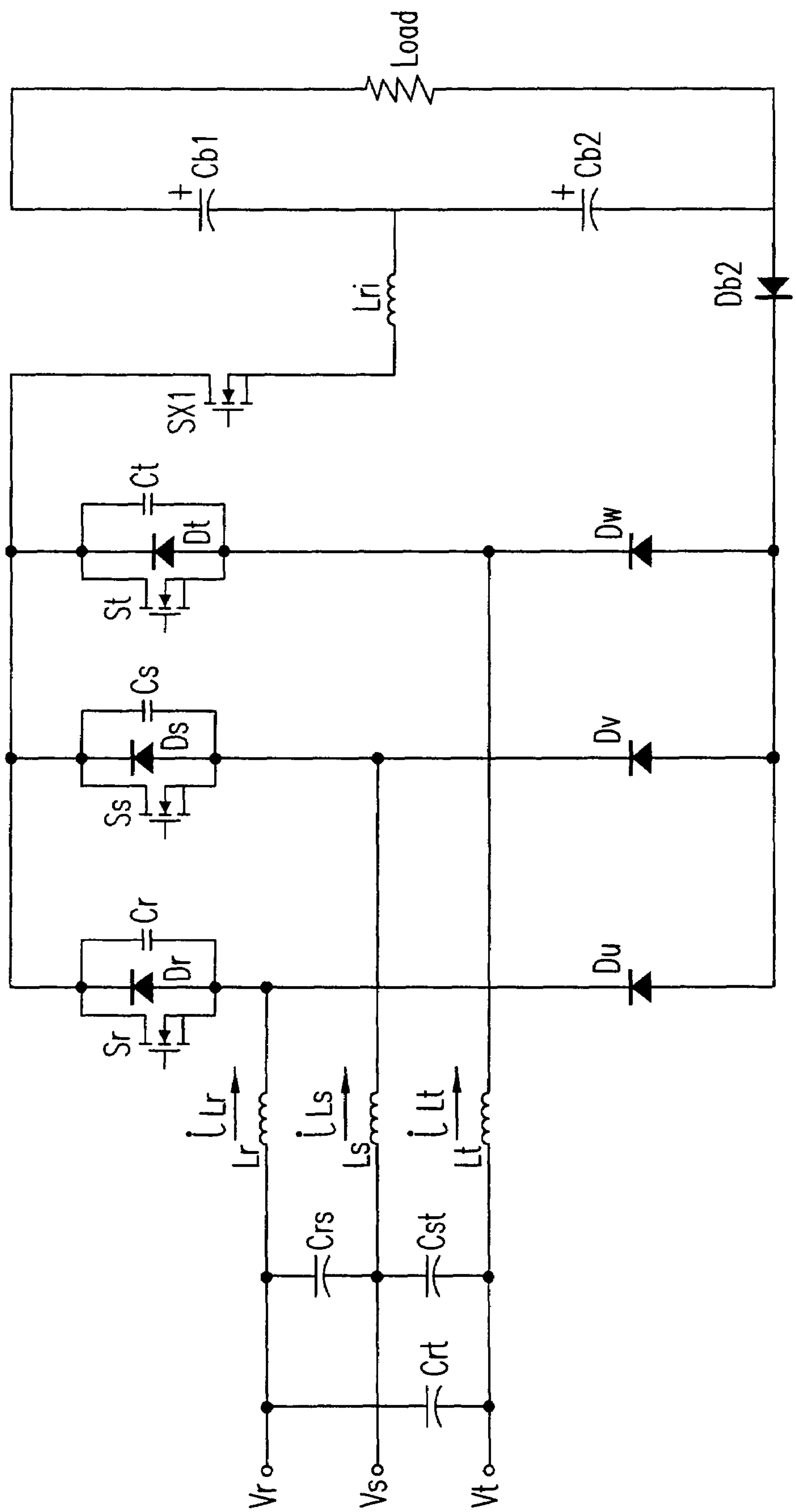

Please refer to FIG. 8, which is the equivalent circuit diagram showing the operational principles of Mode 3. Mode 3 begins when the voltage across the resonant capacitor Ct, Vct, or the voltage on the second terminal of the third main switch module St, $V_{DC\text{-}link}$, is very close to zero so as to turn on the main switch modules Sr, Ss, and St and Mode 3 is started to operate. When the main switch modules Sr, Ss, and St are turned on, the boost inductors Lr, Ls, and Lt are all under the energy-storing mode and the resonant inductor Lri is discharged according to the following formula:

$$i_{Lri} = \frac{-\frac{1}{2}Vo}{Lri}t.$$

When the current on the resonant inductor Lri, iLri, is discharged to zero, the resonant inductor Lri is blocked by the diode Db2, which is reverse-biased, and Mode 2 is ended at this moment.

Figure 9:
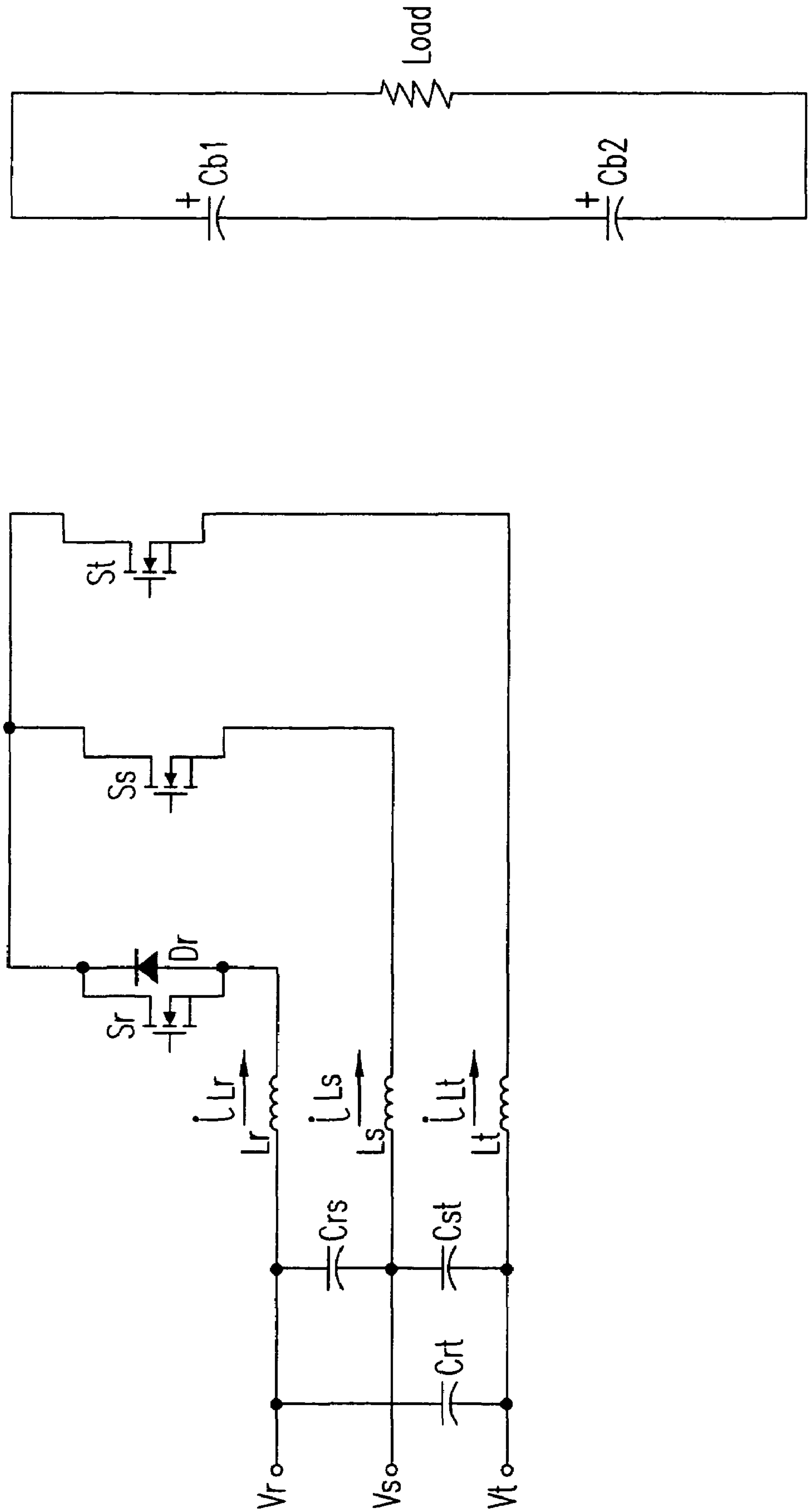

Please refer to FIG. 9, which is the equivalent circuit diagram showing the operational principles of Mode 4. Mode 4 begins when the iLri is discharged to zero. There is no switching loss when the first auxiliary switch Sx1 (or the second auxiliary switch Sx2) is turned on or turned off during the operational period of Mode 4 since the first auxiliary switch Sx1 (or the second auxiliary switch Sx2) is switched under the zero current circumstances. During this operational period, the boost inductors Lr, Ls, and Lt are still under the energy-storing mode.

Figure 10:
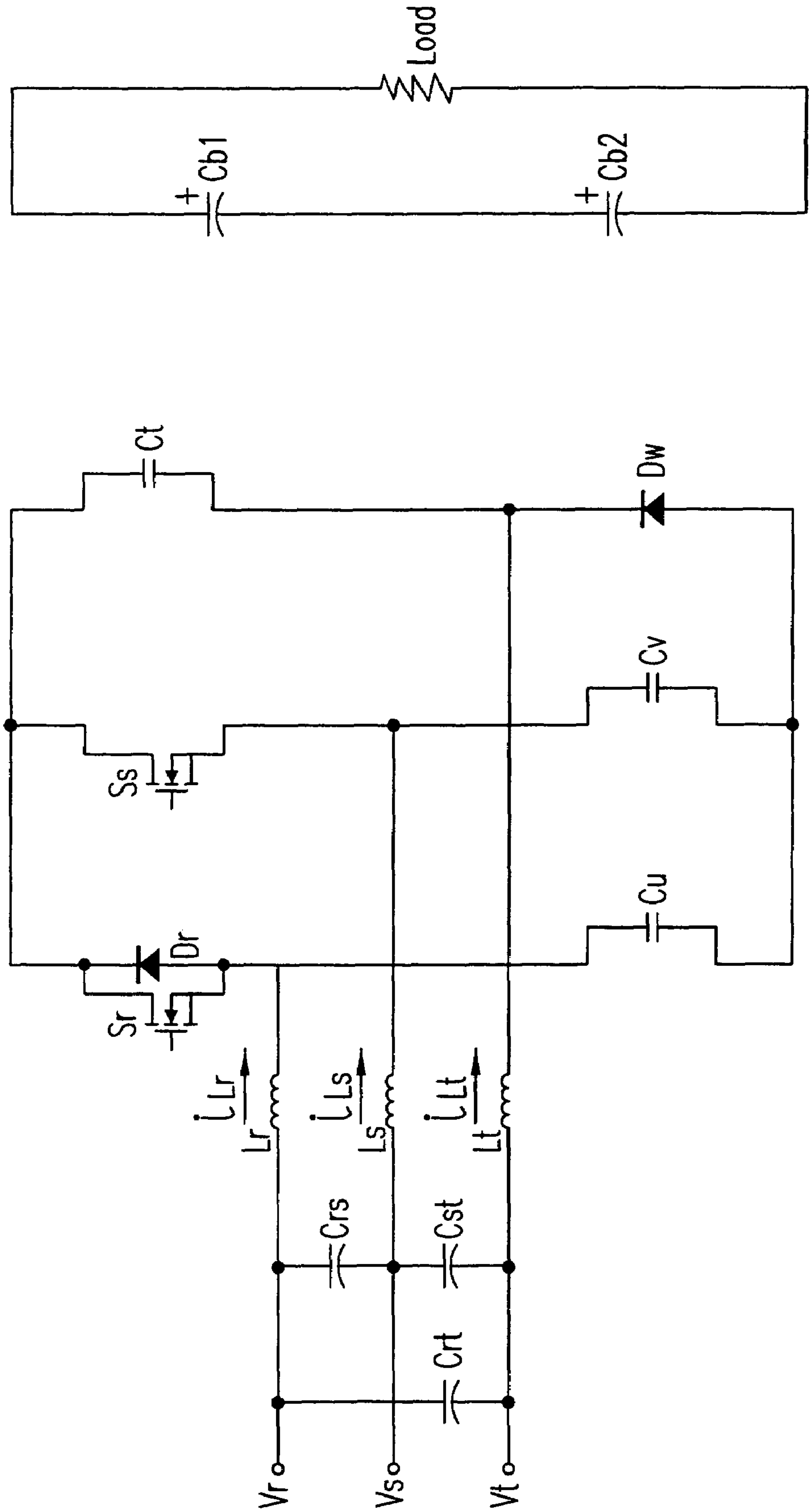

Please refer to FIG. 10, which is the equivalent circuit diagram showing the operational principles of Mode 5. Mode 5 starts to operate when the third main switch module, St, is turned off due to the voltage on the second terminal of the third main switch module is zero. Since the resonant capacitors Cu, Cv, and Ct relate to the status of the third main switch module, St, which is turned off under the circumstances of zero voltage, and the voltage across the capacitor Ct, Vct, is charged and risen linearly, the relationships among Cu, Cv, Ct, and St can be represented by the following formula:

$$V_{ct} = \frac{i_{Lt}}{Cu + Cv + Ct}t.$$

Where, Vct is the voltage across the capacitor Ct, iLt is the current on the boost inductor Lt, Cu, Cv, and Ct are the capacitances of the capacitors Cu, Cv, and Ct, and t is the time respectively.

Figure 11:
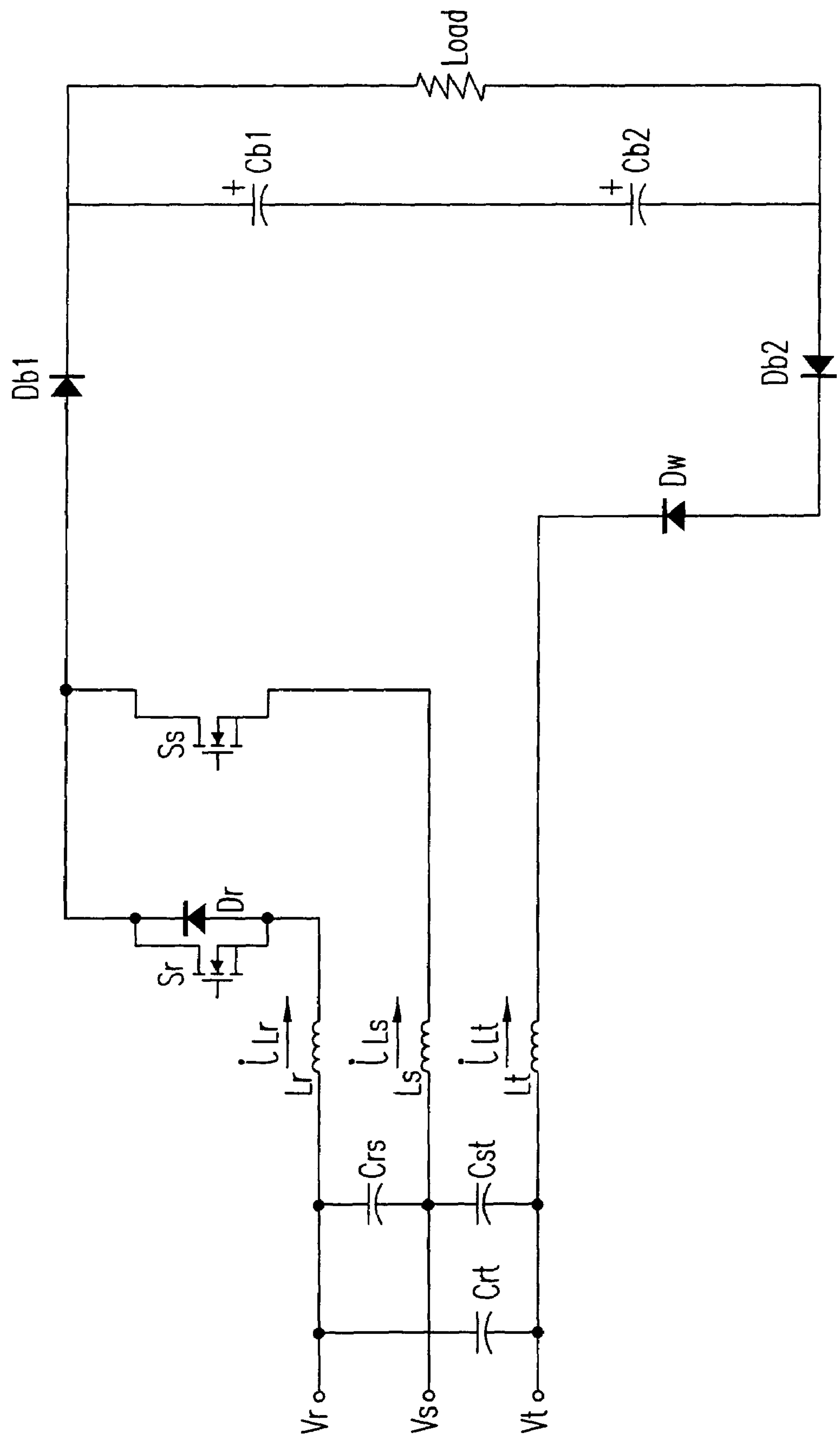

Please refer to FIG. 11, which is the equivalent circuit diagram showing the operational principles of Mode 6. Mode 6 begins when the voltage across the resonant capacitor Ct, Vct, is equivalent to the output voltage of the converter Vo, the current on the boost inductor Lt, iLt, will flow to the output capacitors, Cb1 and Cb2, and the load since Vct is clamped by the output voltage of the converter Vo.

Figure 12:
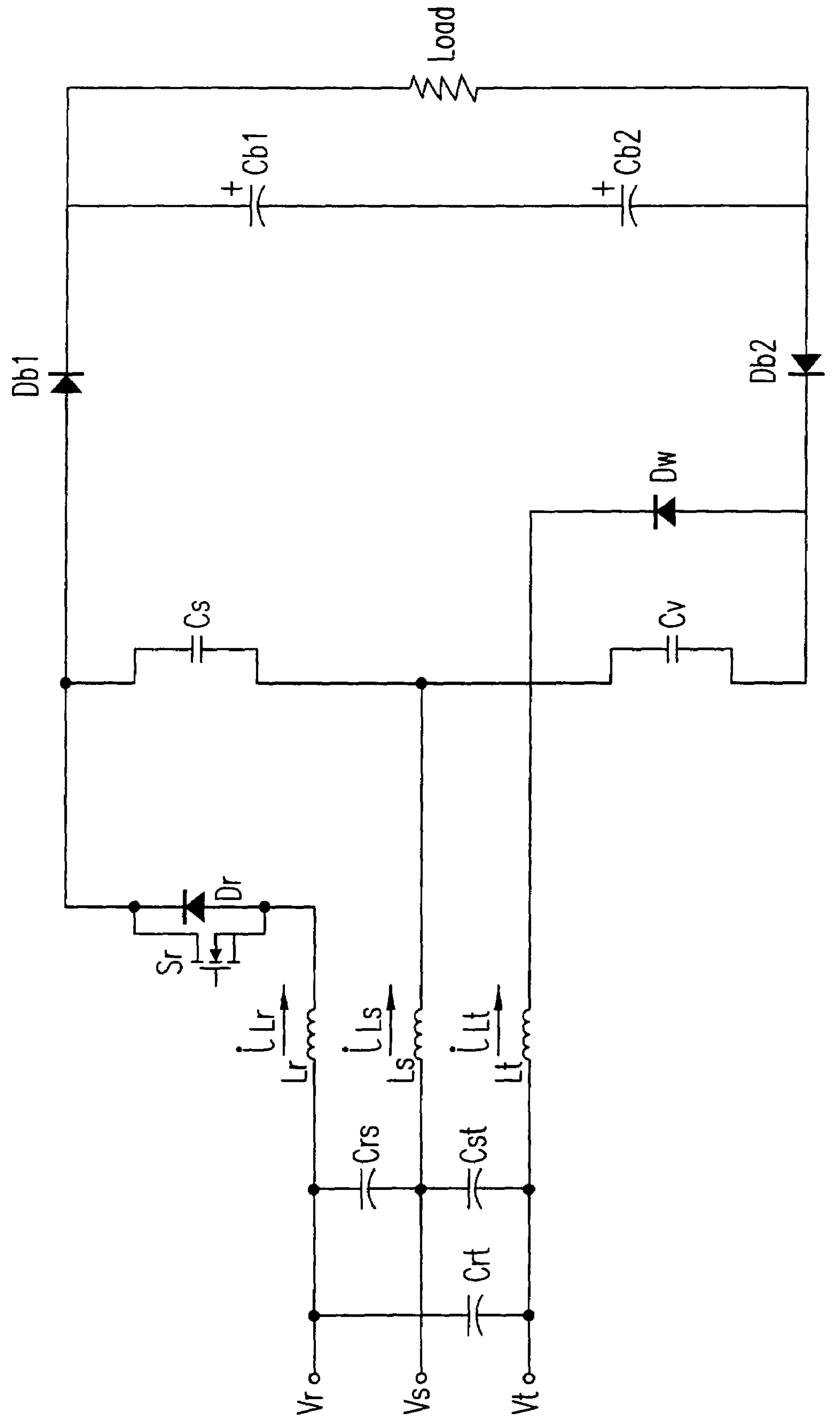

Please refer to FIG. 12, which is the equivalent circuit diagram showing the operational principles of Mode 7. Mode 7 begins when the main switch module Ss is turned off. The capacitors Cs and Cv included in the main switch modules Ss and Sv respectively are either charged or discharged linearly by the current on the boost inductor Ls, iLs. When the voltage across the resonant capacitor Cv of the main switch module Sv, Vcv, is decreased to zero and the diode Dv of the main switch module Sv is conducted, Mode 7 is ended.

As for Mode 8 (=Mode 0), a new cycle of Mode 0 to Mode 7 begins at Mode 8. Namely, the boost inductor Lri is in the discharging mode, and the energies of the boost inductors Lr, Ls, and Lt and the input voltages from the commercial power supply Vr, Vs, and Vt are transferred to the output capacitors Cb1 and Cb2, and the load through the diodes Dr, Db1, Db2, Dv, and Dw respectively (see FIG. 5).

Figure 13:
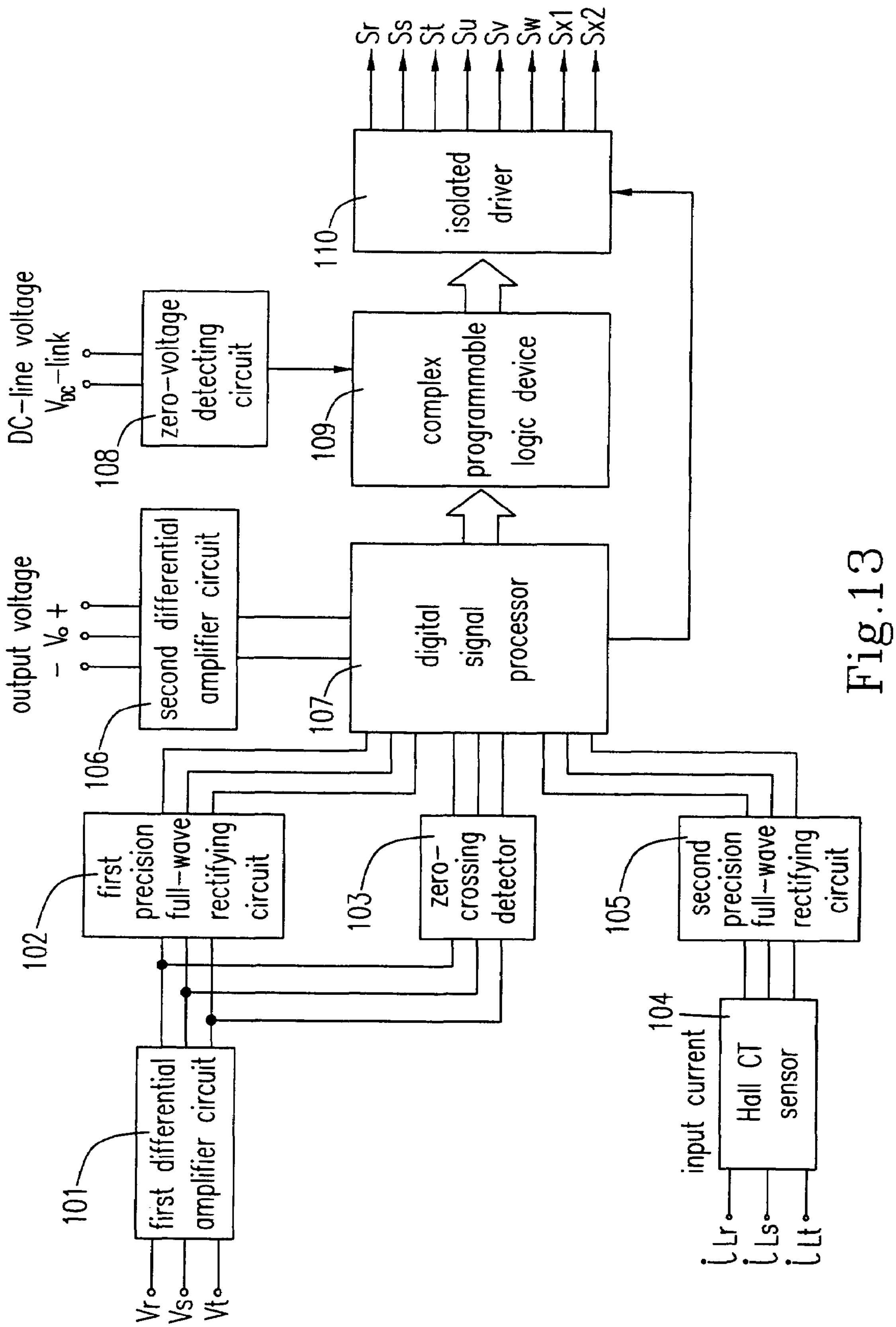
FIG. 13 is the schematic circuit diagram of the control circuit of the three-phase power factor correction converter of the present invention.

Please refer to FIG. 13, which is the block diagram of the control circuit 1 of the proposed three-phase power factor correction converter. The control circuit 1 includes: a first differential amplifier circuit 101 electrically connected to the input voltages Vr, Vs, and Vt, a first precision full-wave rectifying circuit 102 electrically connected to the first differential amplifier circuit 101, a zero-crossing detector 103 electrically connected to the first differential amplifier circuit 101, the input currents which are the measured currents on the boost inductor Lr, Ls, and Lt, iLr, iLs, and iLt, a Hall CT sensor 104 electrically connected to the input currents iLr, iLs, and iLt, a second precision full-wave rectifying circuit 105 electrically connected to the Hall CT sensor 104, an output voltage Vo of the converter, a second differential amplifier circuit 106 electrically connected to the output voltage Vo, a digital signal processor (DSP) 107 having a built-in A/D converter electrically connected to the first precision full-wave rectifying circuit 102, the zero-crossing detector 103, the second precision full-wave rectifying circuit 105, and the second differential amplifier circuit 106 for obtaining the input voltage Vr, Vs, and Vt from the commercial power supply, the input current iLr, iLs, and iLt, and the output voltage Vo through the A/D converter and outputting six sinusoidal pulse-width modulation (PWM) signals according to a six-step control method, a DC-link voltage $V_{DC\text{-}link}$, a zero-voltage detecting circuit 108 electrically connected to the DC-link voltage $V_{DC\text{-}link}$, a complex programmable logic device (CPLD) 109 electrically connected to the DSP 107 and the detecting circuit 108 for combining the six sinusoidal PWM signals with an output of the detecting circuit 108 by a soft-switching method so as to get the driving signals, and an isolated driver 110 having a driving chip and a plurality of output terminals electrically connected to the CPLD 109 and the DSP 107, wherein the driving signals are outputted from the driver 110 and sent to the control terminals of the first to the sixth modules and the first and the second auxiliary switches Sr, Ss, St, Su, Sv; Sw, Sx1, and Sx2 (not shown), which are driven by the driving signals through the chip. The control circuit 1 is a processing unit focused on the DSP 107. The main functions of the DSP 107 are: employing the digital phase-locked loop (DPLL), generating the current reference signals, implementing the current feedback compensation, generating the sinusoidal pulse-width modulation (SPWM) signals, and implementing the voltages feedback compensation. The six SPWM signals generated by the DSP 107 are outputted to the CPLD 109, and the six-step control method and the soft-switching method are employed by the CPLD 109 to manipulate the six main switch modules and the two auxiliary switches. Firstly, the first to the sixth main switches are turned on or off when the voltages, $V_{DC\text{-}link}$, on the second terminals of these main switch modules are zero, and the first and the second auxiliary switches are turned on or off when the currents flow into the first and the second auxiliary switches are zero (namely, iLri=0). Secondly, the six SPWM signals are combined with the output from the zero-crossing detector to generate the drive signals of the six main switch modules Sr, Ss, St, Su, Sv, and Sw, and the two auxiliary switches Sx1 and Sx2. These driving signals are employed to drive the six main switch modules and the two auxiliary switches through the driving IC (e.g., an optical-coupled IC) of the driver.

Figure 14:
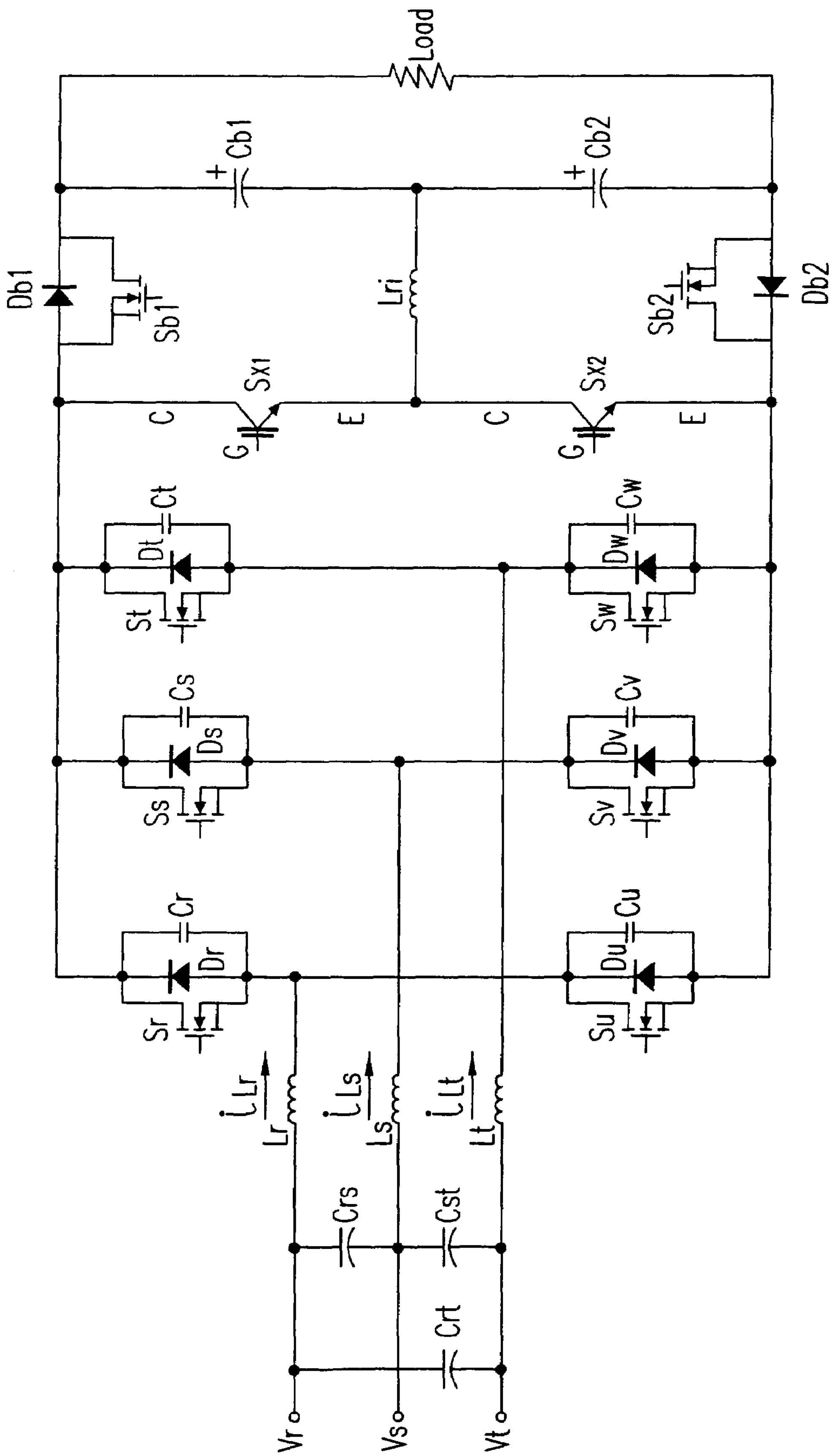
FIG. 14 is the schematic circuit diagram of the second preferred embodiment of the three-phase power factor correction converter of the present invention.

Please refer to FIG. 14, which is the second preferred embodiment of the present invention. The differences between the second and the first preferred embodiments are that two unidirectional IGBTs are employed as the first and second auxiliary switches Sx1 and Sx2, and two concurrent switches each having a diode element and a concurrent switch (Db1+Sb1) and (Db2+Sb2) are employed as the first and second main diodes respectively in the second preferred embodiment so as to decrease the transmission losses relatively. The two concurrent switches could be turned on after each of the inner diode of the concurrent switch (e. g., a MOSFET) is conducted to assure that there is no switching loss.

According to the above descriptions, the proposed soft-switching three-phase power factor correction converter has the special features as follows. Firstly, a six-step control method is employed to adjust the six SPWM signals. Secondly, a soft-switching method is employed to generate the driving signals of the six main switch modules and the two auxiliary switches by combining the six SPWM signals and the output from the zero-voltage detecting circuit so as to turn on/off the six main switch modules when the voltage on the second terminal of each main switch module is zero. Thirdly, the rectifying elements having relatively lower forward voltages are employed in the rectifying circuits. Fourthly, the magnetic elements having relatively smaller sizes could be employed due to the relatively higher switching frequency with lower switching losses. In conclusion, the proposed three-phase power factor correction converter has the following advantages: achieving the lower transmission and switching losses, employing the magnetic elements having relatively smaller sizes, correcting the input power factor (to approach the value of 1), lowering the THD (to less than 5%), increasing the efficiency of the proposed converter, decreasing the voltage changing rates of the main switch modules (dv/dt), decreasing the current changing rates of the auxiliary switches (di/dt), decreasing the EMI, etc. relatively.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A three-phase power factor correction converter, comprising:

- a filter circuit having a plurality of capacitors electrically connected to a three-phase commercial power supply;
- a plurality of boost inductors electrically connected to said filter circuit;
- a plurality of half-bridge switching devices each having an upper main switch module, a lower main switch module, and a connecting node of said upper and lower main switch modules electrically connected to one of said boost inductors; and
- a soft-switching cell electrically connected to said switching devices for soft-switching said switching devices, comprising:
  - a plurality of auxiliary switching devices each having an upper auxiliary switch and a lower auxiliary switch electrically connected to said half-bridge switching devices;
  - a plurality of resonant inductors each having a first terminal electrically connected to one of said auxiliary switching devices;
  - a plurality of output capacitors each electrically connected in series to one of said resonant inductors; and
  - a first and a second diodes electrically connected to said auxiliary switching devices and said output capacitors,
- wherein, said converter is electrically connected to a control circuit for inputting a plurality of driving signals generated according to a six-step control method, and said driving signals are employed to drive said switching devices and said auxiliary switching devices according to a soft-switching method so as to achieve a correction of a power factor for said converter.

2. The converter according to claim 1, wherein said boost inductors comprise a first inductor, a second inductor, and a third inductor each having a first terminal electrically connected to one of three output terminals of said power supply.

3. The converter according to claim 2, wherein said filter circuit comprises a first, a second, and a third capacitors, said first capacitor is electrically connected to said first terminals of said first and said second inductors, said second capacitor is electrically connected to said first terminals of said second and said third inductors, and said third capacitor is electrically connected to said first terminals of said first and said third inductors.

4. The converter according to claim 3, wherein said switching devices comprise a first, a second, and a third switching devices, said connecting nodes of said first, said second, and said third switching devices are electrically connected to the second terminal of said first, said second, and said third inductors respectively.

5. The converter according to claim 4, wherein said soft-switching cell comprises an auxiliary switching device, a resonant inductor, a first and a second output capacitors, and a first and a second diodes.

6. The converter according to claim 5, wherein each of said upper and lower main switch modules of said first to third switching devices further comprises a switch element, a diode element, and a capacitor element, said switch element and said upper and lower auxiliary switches of said auxiliary switching device each comprises a first, a second, and a control terminals, an anode of said diode element is electrically connected to said first terminal of said switch element, a cathode of said diode element is electrically connected to said second terminal of said switch element, a first and a second terminals of said capacitor element are electrically connected to said anode and said cathode of said diode element, and said first terminals of said lower main switch modules of said first to third switching devices and lower auxiliary switch are electrically connected, said second terminals of said upper main switch modules of said first to third switching devices and said upper auxiliary switch are electrically connected, and said second terminals of said lower main switch modules of said first to third switching devices and said lower auxiliary switch and said first terminals of said upper main switch modules of said first to third switching devices and said upper auxiliary switch are electrically connected at said connecting nodes respectively.

7. The converter according to claim 6, wherein the first terminals of said first and said second output capacitors are electrically connected to a second terminal of said resonant inductor, an anode of said first diode is electrically connected to said second terminal of said upper auxiliary switch and a cathode of said first diode is electrically connected to a second terminal of said first output capacitor, and an anode of said second diode is electrically connected to a second terminal of said second output capacitor and a cathode of said second diode is electrically connected to said first terminal of said lower auxiliary switch.

8. The converter according to claim 6, wherein each of said switch element and said upper and lower auxiliary switches is one of a MOSFET and a combination of an IGBT and a diode electrically connected in parallel, and said capacitor element is a resonant capacitor.

9. The converter according to claim 6, wherein said capacitor element is one of a built-in capacitor and an external capacitor.

10. The converter according to claim 6, wherein each of said upper and said lower auxiliary switches is a unidirectional IGBT.

11. The converter according to claim 5, wherein each of said first and said second output capacitors is an electrolytic capacitor.

12. The converter according to claim 5, wherein each of said first and said second diodes is a synchronous diode.

13. The converter according to claim 12, wherein said synchronous diode further comprises a diode element and a synchronous switch, wherein said synchronous switch comprises a first terminal electrically connected to an anode of said diode element, a second terminal electrically connected to a cathode of said diode element, and a control terminal.

14. The converter according to claim 7, wherein said control circuit further comprises:

- a first differential amplifier circuit electrically connected to said power supply;

a first precision full-wave rectifying circuit electrically connected to said first differential amplifier circuit;

a zero-crossing detector electrically connected to said first differential amplifier circuit;

an input current;

a Hall CT sensor electrically connected to said input current;

a second precision full-wave rectifying circuit electrically connected to said Hall CT sensor;

an output voltage of said converter;

a second differential amplifier circuit electrically connected to said output voltage;

a digital signal processor (DSP) having a built-in A/D converter electrically connected to said first precision full-wave rectifying circuit, said zero-crossing detector, said second precision full-wave rectifying circuit, and said second differential amplifier circuit for obtaining an input voltage from said power supply, said input current, and said output voltage through said A/D converter and outputting six sinusoidal pulse-width modulation (SPWM) signals according to said six-step control method;

a DC-link voltage;

a zero-voltage detecting circuit electrically connected to said DC-link voltage;

a complex programmable logic device (CPLD) electrically connected to said DSP and said detecting circuit for combining said six SPWM signals with an output of said detecting circuit by said soft-switching method so as to get said driving signals; and an isolated driver having a driving chip and a plurality of output terminals electrically connected to said CPLD and said DSP, wherein said driving signals are outputted from said driver and received by said control terminals of said upper and lower main switch modules of said first to third switching devices and said upper and said lower auxiliary switches for driving said modules and said switches through said chip.

* * * * *